Dec. 26, 1950

C. L. LANCE 2,535,935

GRIPPER FOR PRINTING PRESSES

Filed Sept. 20, 1946

INVENTOR.
Chester L. Lance
BY Ahley & Ahley
ATTORNEYS

UNITED STATES PATENT OFFICE 2,535,935

GRIPPER FOR PRINTING PRESSES

Chester L. Lance, Dallas, Tex.

Application September 20, 1946, Serial No. 698,223

7 Claims. (Cl. 101—408)

This invention relates to new and useful improvements in grippers for printing presses and in particular to means for mounting such grippers on gripper bars.

It has been customary heretofore, to secure grippers, or gripper arms, to gripper bars in printing presses by means of a transverse bolt connecting the two elements and a depending lip formed on the gripper and engaging within a groove provided on the gripper bar. Such an arrangement has been satisfactory in some respects, but makes for a clumsy arrangement when it is desired to detach or change grippers. It is necessary to loosen and disengage the bolt entirely so as to allow the gripper to be removed or replaced. Normally, in changing from one printing job to another, the grippers are not removed and obstruct the work.

This arrangement becomes even more clumsy on some of the newer and more elaborate presses having what is commonly known as a "Delayed Gripper Action." On such presses the gripper remains closed on the platen of the press for a longer period of time. With such delayed gripper action the making ready of a printing job is delayed and becomes unnecessarily expensive. With this improved removal gripper a free and unobstructed platen and a quicker make-ready is obtained through the rapid removal feature.

Another disadvantage of the older type of gripper is the difficulty experienced in holding the gripper absolutely rigid with respect to the gripper bar. These bars are cast and are not accurately machined, so that sometimes the space between the longitudinal groove carried by the gripper bar and the longitudinal slot through which the bolts extend may vary considerably. Being cast, the lower side of the bar does not offer an absolutely flat surface to be engaged by the head of the bolt, so that in some cases, the bolt head engages only at two diametrically opposed points and allows a small amount of end play in the gripper.

It is therefore, one object of this invention to provide an improved gripper for printing presses having means for securing it to a gripper bar which allow the ready and quick removal of the gripper with only slight loosening of the securing bolt.

Another object of the invention is to provide an improved gripper for printing presses having a mounting for securing it to a gripper bar which provides a very rigid connection between these two elements and permits the ready removal of the gripper.

Yet another object of the invention is to provide an improved bolt for mounting a gripper on a gripper bar in a printing press, said bolt being self-aligning so as to hold the gripper rigidly against movement with respect to the gripper bar.

A still further object of the invention is to provide an improved gripper for printing presses which is made in two pieces, one of which is secured to the gripper bar of the press and interlocks with the other portion of the gripper to hold the same securely in a laterally extending position with respect to the gripper bar, and which permits the quick and easy removal of the gripper from the gripper bar, when so desired, and more especially at make-ready time as indicated above.

A construction designed to carry out the invention will be hereinafter described together with other features of the invention.

The invention will be more readily understood from a reading of the following specification and by reference to the accompanying drawing, wherein an example of the invention is shown, and wherein.

Figure 1:
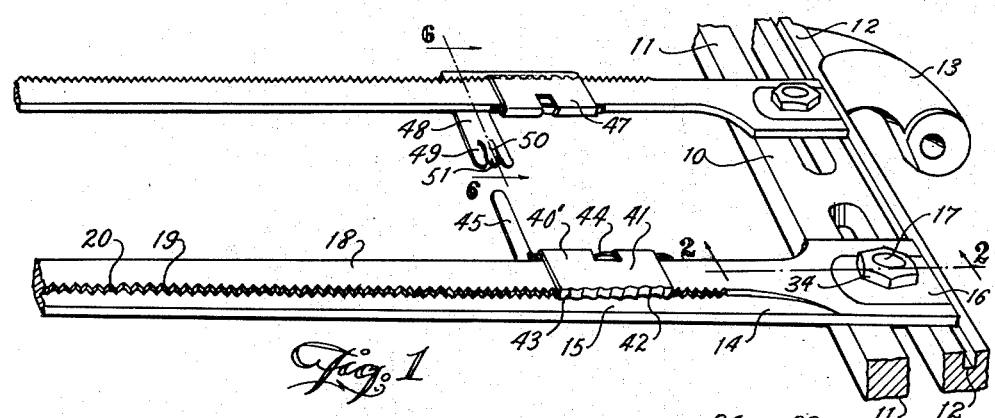
Fig. 1 is an isometric view showing a portion of a gripper bar having two types of grippers connected thereto and constructed with this invention.

In the drawings, the numeral 10 designates a gripper bar for a printing press, said bar being made in accordance with the usual practice. The bar is provided with an interrupted, longitudinal slot 11, and a continuous longitudinal groove 12. A laterally extending arm 13 is formed on the bar for actuating the latter, and the usual trunnions (not shown) are provided for pivotal mounting of the bar within the printing press.

In accordance with the present invention, a gripper or gripper arm 14 is secured to the gripper bar. These gripper elements are in the form of an elongate bar or arm and are known in the trade as "grippers." The terms gripper and gripper arm will be used synonymously. The gripper 14 includes an elongate, outer portion 15 and a clamping plate 16. The two elements are clamped together and held on the bar 10 by a bolt 17, to be described hereinafter.

The outer portion 15 of the gripper is formed of an elongate flat arm 18 tapered in width from its base to its outer extremity. The upper surface of the bar 18 is partially milled away to form a short, vertical, longitudinal shoulder 19 extending substantially throughout the length of the bar. Serrations or teeth 20 are formed on the face of the shoulder 19 so as to face laterally thereof and of the bar 18. The teeth 20 function to secure the auxiliary gripper fingers as will be described hereinafter.

Figure 4:
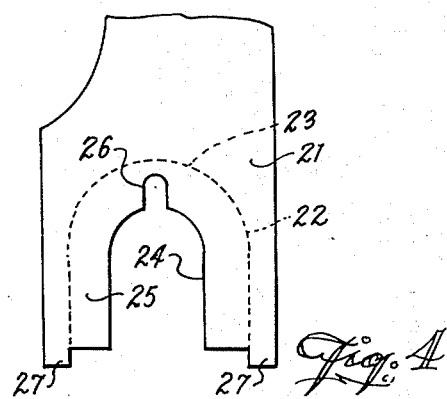
Fig. 4 is an enlarged, bottom plan view of the inner end of one of the grippers.
Figure 5:
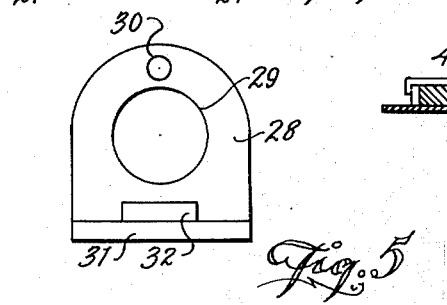
Fig. 5 is an enlarged, bottom plan view of the retaining plate.
Figure 6:
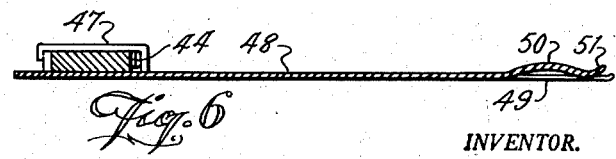
Fig. 6 is a transverse, vertical, enlarged sectional view of one of the auxiliary gripper fingers, the view being taken on line 6—6 of Fig. 1.

The inner portion or base 21 of the outer portion 15 of the gripper is greater in width than the bar 18, as is shown in Figs. 1 and 4. A recess 22 is milled, or otherwise cut, in the upper space of the base 21, the recess being less in width than the base and extending longitudinally of the gripper. The outer end 23 of the recess is semi-circular in cross-section, as shown in dotted lines in Fig. 4. A complementary notch 24, similar in shape but smaller than the recess 22, is provided in the inner end of the base 21 intermediate the edges of said base. The recess thus cooperates with the notch 24 to form a marginal, clamping flange 25 surrounding the notch and of less thickness than the base 21. A second, smaller notch 26 having a similar semi-circular bottom is cut in the flange 25 at the outer end of the notch 24. A rectangular longitudinally projecting lug 27 is provided at either end of the inner edge of the base 21, the lugs 27 being spaced apart a distance equal to the width of the recess 22. The lugs are equal in thickness to the base 21 and represent an extension thereof.

Figure 2:
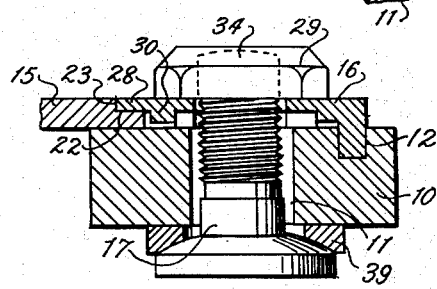
Fig. 2 is an enlarged, vertical, sectional view taken on the line 2—2 of Fig. 1.
Figure 3:
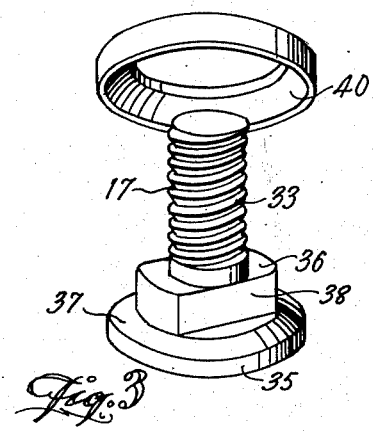
Fig. 3 is an enlarged, isometric, exploded view of the bolt and washer.

For securing the gripper to the gripper bar, a clamping plate 28 is provided. The plate 28 is of such configuration as to fit snugly within the recess 22, and is substantially equal in thickness to the depth of the recess, as shown in Fig. 2 of the drawings. A central bolt hole 29 is provided in the plate for receiving the bolt 17, and a depending pin or projection 30 is positioned on the lower face of the plate between the hole 29 and the outer, curved end of said plate so as to engage within the notch 26 and rest snugly against the curved bottom thereof. A depending lip 31 is provided along the rearward or inner edge of the plate 28, the lip being adapted to engage between the lugs 27 and depend below the lower face of the base 21 into the groove 12. The lip has a sliding fit within the groove so as to facilitate its insertion and removal therefrom. An elongate, rectangular lug 32, slightly less in thickness than the flange 25, is formed intermediate the lateral edges of the plate 28 between the hole 29 and the lip 31, the lug 32 abutting said lip. The lug 32 is adapted to engage within the open end of the notch 24, the lateral walls of the notch engaging the ends of the lug. The plate 28 is positioned on the upper surface of the gripper bar 10 so as to extend transversely thereof, the depending lip 31 engaging within the groove 12. In this position, the bolt hole 29 overlies one of the slots 11 and the curved outer end of the plate overlies the outer portion of said bar. The gripper 15 is engaged beneath the clamping plate 28 so that the flange 25 underlies said plate, the depending pin 30 engaging within the notch 26 and the lug 32 engaging within the open inner end of the notch 24. At the same time the lugs 27 engage each side of the plate 28 and lip 31. Thus, the gripper is held to some extent against pivotal movement about the bolt 17 by the pin 30, the lug 32, and the lug 27.

For securing the gripper and the clamping plate 28 to the gripper bar 10, the bolt 17 is provided. The bolt is formed with the usual screw-threaded shank 33 and hexagonal nut 34. The head 35 of the bolt is circular, in the usual manner, and is enlarged so as to be incapable of passing through the slots 11. The bolt head is somewhat thicker than usual, and has its lower portion reduced in diameter to form a boss 36 and an annular shoulder 37. The boss is less in diameter than the head 35 but greater in diameter than the width of the slot 11. Diametrically opposed sides of the boss 36 are cut away to form laterally directed flat faces 38 which permit the insertion of the boss into the slot 11 and prevent rotation of the bolt with respect to the bar 10.

The shoulder 37 is convex in cross-section, and a alining washer or ring 39 having one concave face 40 rests thereon so as to have the concave face 40 engaging the convex face of the shoulder 37. The outside diameter of the ring 39 is slightly greater than the outside diameter of the bolt head 35, while the inside diameter of the ring is sufficient to receive the boss 36. The bolt 17 extends transversely of one of the slots 11, and the ring 39 is confined between the bolt head 35 and the lower side or face of the gripper bar 10. The screw-threaded shank 33 projects upwardly through the slot 11 and the bolt hole 29 in the clamping plate 28, and receives the nut 34.

The concave washer 39 and the convex head of the bolt function as an alining or universal pivoting means to provide efficient frictional gripping of the upper side of the plate 28 and the lower side of the bar 10. Since these two surfaces are usually slightly out of parallel either longitudinally or transversely, or both, the washer or ring 39 adapts itself to close engagement with the underside of the gripper bar, while the bolt head may pivot thereabout, in the manner of a ball and socket joint, to allow the nut 34 to aline itself in conformity with the plane of the upper surface of the plate 28. A secure frictional gripping engagement is thus achieved both with the bar 10 and the plate 28, so that very rigid and efficient clamping action ensues. It is usually desirable to form the bolt and the nut, along with the ring 39, of a heat-treatable alloy, and to harden the same after manufacture, so that the bolt and its allied elements can withstand the stresses of the clamping arrangement without undue wear or distortion.

As the nut 34 is tightened upon the shank 33, the clamping plate 28 is forced downwardly upon the flange 25, thus securing the outer portion 15 of the gripper very rigidly to the gripper bar 10. This is a very desirable feature, since lateral movement of the gripper can seriously impair the operation of the printing press by allowing the grippers and auxiliary gripper fingers usually carried by said grippers to become misalined with respect to the work being done and the type with which the work is being printed. These gripper fingers often must be very exactly set so as to be positioned between two lines of type, and obviously movement of the fingers would ruin the type form of work being done.

Also, friskets are often held by some suitable means so as to overlie the sheet being printed and blank out a portion of the type which has been set. It is manifest, that misalinement of such a frisket might easily necessitate the re-printing of considerable amount of material.

It is not necesary to utilize the self-alining bolt with this gripper mount. An ordinary bolt may be used in many cases with considerable success.

An improved form of auxiliary gripper finger 40' is shown in Fig. 1 of the drawings. This finger includes a mounting clip 41, substantially U-shaped in cross-section, which engages above and beneath the bar 18 and around one edge thereof. The outer end of one of the legs is turned downwardly to form a depending lip 42 provided with suitable teeth 43 to engage the teeth 20 formed on the shoulder 19 of said bar. A flat leaf spring 44 is confined between the lateral edge of the bar 18 and the side of the clip 41 so as to urge the clip laterally and move the teeth 43 into meshing engagement with the teeth 20. The clip is thus held securely against movement longitudinally of the bar but may be adjusted readily thereon by pressing inwardly against the spring 44 to disengage the teeth 43 and allow such longitudinal movement. A laterally projecting finger 45 is carried by the clip 41 and functions in the usual manner of holding the sheet being printed while the type is impressed thereon and to prevent the paper from sticking to the type as the latter is raised. As is the usual practice, the fingers 45 may be made of various lengths so as to fulfill various desired purposes in accordance with the particular printing job being done.

The upper gripper in Fig. 1 represents a modified type of gripper which is considerably less in width than the normal gripper shown in the lower portion of the figure, and is usually lighter in weight and construction. This modified type is secured to the gripper bar in the same manner as the first type described, and carries a similar auxiliary gripper finger 47. The finger element 48, shown in this form differs from the finger 45 in having its outer end provided with two longitudinal slots 49 so as to divide the outer extremity of the finger into three projecting segments or strips. The center strip 50 is bowed upwardly near its center and provided with an upturned tip 51, so that the mask or frisket may be inserted between the strips and securely held thereby. Various shape friskets may be utilized so as to blank off certain portions of the printing words, and more especially blank out "No." plungers in typographic numbering machines and may be held in any desired position with this arrangement. Again, this second type of gripper finger may be made in various lengths so as to be adaptable to the particular work at hand.

In the operation of this device, the grippers are secured to the gripper bar in the manner described hereinbefore. When it is desired to shift a gripper along the gripper bar, or to remove one of the grippers, it is only necessary to loosen the nut 34 a relatively small amount so as to free the flange 25 from the clamping action of the plate 28. The gripper may then be slid outwardly from beneath the clamping plate, and removed entirely or replaced with another gripper. Or the plate 28 may be shifted laterally along the gripper bar 18 and the gripper re-inserted, or the entire unit shifted without disengagement with the gripper. Only a quarter or half turn of the nut 34 is required to accomplish this operation. The nut need not be disengaged entirely from the bolt, or loosened an excessive amount to free the gripper. A considerable saving in time is thus effected, and shifting and rearranging the gripper in accordance with the requirements of various printing jobs is facilitated.

Through the removal feature of the gripper as heretofore stated, the operator of the printing press is afforded greater convenience through lack of obstruction caused by working underneath the grippers as has been the custom heretofore. Also through said removal feature, damage to type forms are often avoided when a wider form is put on the press following the running of a narrow form, and the operator forgetting to move or spread the grippers before making the first impression.

At the same time, an extremely rigid mounting for the gripper is provided. With the utilization of the self-alining bolt 17, an exceptionally secure mounting for the gripper is obtained, so that inadvertent shifting or pivoting of the gripper, and the auxiliary gripper fingers carried thereby, is prevented. Obviously, the nut 34 could be formed with a convex face to co-act with a concave washer in properly alining the bolt. Or, both the nut and the bolt head could be provided with such faces.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A gripper for printing presses having a gripper bar provided with a longitudinal groove and longitudinal slots including, an elongate arm having one end overlying the gripper bar, said overlying end being formed with a bolt-receiving notch extending thereinto and a recess contiguous to said notch, a clamping plate adapted to overlie the notched end of the arm and engage within the recess, and a bolt extending through one of the slots in the gripper bar and said clamping plate for holding the plate and the arm in clamped relation thereto.

2. A gripper for printing presses having a gripper bar provided with a longitudinal groove and longitudinal slots including, an elongate arm having one end overlying the gripper bar, said overlying end being formed with a bolt receiving notch and a recess contiguous to said notch extending thereinto a clamping plate adapted to overlie the notched end of the arm and engage within the recess, means carried by the plate engaging within the groove for preventing rotative movement of the plate with respect to the gripper bar, and a bolt extending through one of the slots in the gripper bar and said clamping plate for holding the plate and the arm in clamped relation thereto.

3. A gripper for printing presses having a gripper bar provided with a longitudinal groove and longitudinal slots including, an elongate arm having one end overlying the gripper bar, said overlying end being formed with a bolt receiving notch and a recess contiguous to said notch extending thereinto, a clamping plate adapted to overlie the notched end of the arm and engage within the recess, means carried by the plate and co-acting with means carried by the arm for preventing rotative movement of the arm with respect to the plate, and a bolt extending through one of the slots in the gripper bar and said clamping plate for holding the plate and the arm in clamped relation thereto.

4. A gripper for printing presses having a gripper bar provided with a longitudinal groove and longitudinal slots including, an elongate arm having one end overlying the gripper bar, said overlying end being formed with a bolt receiving notch extending thereinto and a recess contiguous to said notch, a clamping plate adapted to overlie the notched end of the arm and engage within the recess, means carried by the plate engaging within the groove for preventing rotative movement of the plate with respect to the gripper bar, means carried by the plate and co-acting with means carried by the arm for preventing rotative movement of the arm with respect to the plate, and a bolt extending through one of the slots in the gripper bar and said clamping plate for holding the plate and the arm in clamped relation thereto.

5. A gripper for printing presses having a gripper bar provided with a longitudinal groove and longitudinal slots including, an elongate arm having one end overlying the gripper bar, said overlying end being formed with a bolt-receiving notch extending thereinto and a recess contiguous to said notch, a clamping plate adapted to overlie the notched end of the arm and engage within the recess, means carried by the plate engaging within the groove for preventing rotative movement of the plate with respect to the gripper bar, means carried by the plate and co-acting with means carried by the arm for preventing rotative movement of the arm with respect to the plate, a bolt extending through the plate and the gripper bar, said bolt having a head element and a nut element with a shank therebetween, one of said elements having a curved face, and a washer encircling the shank and having a complementary curved face engaging the curved face of said element, thereby providing a self-aligning bolt for clamping the gripper to the gripper bar.

6. A gripper as set forth in claim 1, a second notch of reduced width extending into the arm from the bottom of the first notch, and a projection on the clamping plate adapted to engage within said second notch to prevent rotative movement between the arm and the plate.

7. A gripper as set forth in claim 2, and a lug on the clamping plate adjacent the groove-engaging means of said plate having a snug fit within the open end of the bolt receiving notch.

CHESTER L. LANCE.

REFERENCES CITED

The following references are of record in the file of this patent:

UNITED STATES PATENTS

| Number | Name | Date |
|---|---|---|
| 79,053 | Castle | June 23, 1868 |
| 206,972 | Rosser | Aug. 13, 1878 |
| 412,412 | Paul | Oct. 8, 1889 |
| 573,345 | McGinty | Dec. 15, 1896 |
| 656,566 | McGinty | Aug. 21, 1900 |
| 927,853 | Harris | July 13, 1909 |
| 1,163,305 | Anway | Dec. 7, 1915 |
| 1,168,675 | Richardson | Jan. 18, 1916 |
| 1,352,918 | Rohbock | Sept. 14, 1920 |
| 1,378,648 | Becker | May 17, 1921 |
| 1,603,223 | Villeneuve | Oct. 12, 1926 |
| 1,687,404 | Stowell | Oct. 9, 1928 |
| 2,145,744 | Whitney | Jan. 31, 1939 |
| 2,241,172 | Allen | May 6, 1941 |

FOREIGN PATENTS

| Number | Country | Date |
|---|---|---|
| 18,633/08 | Great Britain | Apr. 1, 1909 |